United States Patent Office 2,949,488
Patented Aug. 16, 1960

2,949,488

METHOD FOR PREPARING POLYCHLOROPHENYL ETHERS AND THIOETHERS

Albert L. Rocklin, Concord, Calif., assignor to The Dow Chemical Company, Midland, Mich., a corporation of Delaware No Drawing. Filed Oct. 26, 1955, Ser. No. 543,018

13 Claims. (Cl. 260—609)

This invention relates to a method for preparing polychlorophenyl ethers and thioethers from polychlorobenzenes and has particular reference to the preparation of various pentachlorophenyl ethers and thioethers from hexachlorobenzene using appropriate alkoxides or mercaptides for the purpose.

Various techniques have been employed for directly preparing polychlorophenyl ethers and thioethers from polychlorobenzenes with the alcohol or mercaptan necessary to form the desired ether or thioether or from a polychlorobenzene with an alkoxide or mercaptide. These techniques may not always be satisfactory, however, in that when a desired alcohol or mercaptan ingredient is employed to react directly with a polychlorobenzene, especially when lower molecular weight materials are involved, it is usually necessary to conduct the reaction under pressure in order to avoid excessive losses by volatilization. Also, at the relatively higher temperatures which usually are required for direct reactions with an alcohol or mercaptan, quite active side reactions are frequently encountered. These may produce undesired ethers and other by-products which tend to contaminate the desired product. In addition, the known reactions frequently proceed at a slower rate than might be desirable even when they are performed under optimum operating conditions.

It would be desirable to prepare relatively pure polychlorophenyl ethers and thioethers in good yield from polychlorobenzenes using the alkoxides and mercaptides which are necessary for preparing the desired products in such a manner that there would be no requirement for operating under superatmospheric pressures or at relatively higher temperatures, especially when lower molecular weight reactants are involved, and that would preclude undesired side reactions from occurring at sufficient rates to cause intolerable quantities of product contaminating by-products to be present.

This may advantageously be accomplished in accordance with the present invention by reacting a polychlorobenzene in pyridic solution at a temperature between about 75° C. and about 125° C. with an alkoxide or mercaptide. A polychlorophenyl ether or thioether product, especially one having lower molecular weight substituents, may thus be consistently obtained without employing superatmospheric pressures or relatively excessive temperatures. The products so obtained have sufficient purity for most purposes to obviate further requirements for purification.

The method of the present invention may be illustrated by the following:

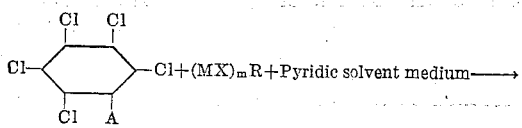

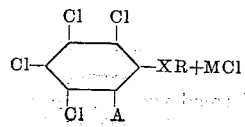

wherein A is selected from the group consisting of chlorine and alkyl group substituents in which the alkyl group may possess from one to eight carbon atoms; M is a cation, advantageously a metallic ion and preferably an alkali metal ion; X is selected from the group consisting of oxygen and sulfur; $m$ is one of the integers 1 and 2; and R is an aliphatic and the like radical. The alkoxide and mercaptide reagent represented by the formula $(MX)_mR$ may be selected from the group consisting of the metal alcoholates of aliphatic mono- and dihydric alcohols and of aliphatic mono- and dithiols.

The polychlorobenzenes which may be employed according to the present invention preferably contain at least five substituent chlorine atoms. Most advantageously it is hexachlorobenzene although, as indicated, pentachloromonoalkylbenzenes (wherein the alkyl group may possess from one to eight carbon atoms) and the like may also be employed. The pyridic solvent in which the polychlorobenzene is dissolved for the reaction is advantageously pyridine or a substituted pyridine such as one of the picolines or lutidines or a mixture of such compounds. However, when lutidines are employed they should be open, i.e. satisfied with hydrogen, on either the 2- or 6-position of the pyridine ring. When both of these positions are simultaneously blocked in a di-substituted pyridine, such as in 2,6-dimethyl pyridine the material tends to be undesirable as a reaction medium in that it does not seem to be conducive to the reactions.

Any suitable alkoxide or mercaptide may be employed to form the desired ether or thioether. Preferably an alkali metal, such as a sodium or potassium, alkoxide or mercaptide is employed. If desired, alkoxides or mercaptides which have been freshly prepared from an alkali metal hydroxide or the elemental alkali metal and the appropriate alcohol or mercaptan may be utilized.

In the reaction according to the method of the present invention, an equimolar ratio of reactants is employed in order to replace one of the chlorine atoms on the substituted benzene with the ether or thioether linkage. An amount of the alkoxide or mercaptide which is about 5 percent in excess of a stoichiometric proportion may frequently be advantageously used. This insures more complete reaction of the quantity of polychlorobenzene which is present.

Any desired concentration of the polychlorobenzene in pyridic solution may be employed although it is convenient to use one as nearly saturated as is possible under the conditions of the reaction. For example, when hexachlorobenzene is dissolved in pyridine, about a 20 percent by weight solution may advantageously be employed, although greater concentrations can also be used, if desired. Generally the reaction ingredients should be proportioned so that the final reaction mixture contains at least about 50 percent by volume of the pyridic solvent. When too great a proportion of alcohol or mercaptan is present it may result in a separate phase being formed and containing undesirable amounts of unreacted alkoxide or mercaptide.

As mentioned, reaction temperatures between about 75° C. and 125° C. may advantageously be employed for most reactants. Preferably, however, the temperature is maintained at the boiling point of the reaction mass whenever it is less than 125° C. The time of reaction will vary according to the reactivity of the various ingredients employed. Frequently the rate of reaction is sufficiently rapid so that completion is substantially attained within a matter of several minutes.

When the reaction is completed, the polychlorophenyl ethers or thioethers may be readily recovered after the unreacted constituents and the like have been removed by suitable means from the reaction mass in order to substantially isolate the product. For this purpose, tech-

Example 1

A sodium mercaptide reagent was prepared by adding about 2.2 grams of finely divided sodium hydroxide to a solution of about 5.0 grams of ethanedithiol in about 25 ml. of pyridine at a temperature of about 100° C. The relatively thick reagent solution was then added to a solution of about 15.1 grams of hexachlorobenzene in about 75 ml. of hot pyridine. The thus formed reaction mass was boiled under reflux for about 0.5 hour while being vigorously agitated. Sodium chloride formed in the reaction mass and was removed by filtration before pouring the reaction mass into about 800 ml. of water. The diluted reaction mass, upon standing overnight, formed a fine precipitate of the product 1,2-bis(thiopentachlorophenyl)ethane. This was recovered upon filtration. About 4.9 grams of the product, melting near 192° C. was thus prepared.

Example 2

About 74 grams of hexachlorobenzene was dissolved in sufficient hot pyridine to make about a 20 percent by weight solution. To this solution about 45.6 grams of disodium thioglycolate (having a purity of about 77.5 percent) was added with constant stirring. The mixture was then refluxed for about eight hours. More pyridine and about 100 ml. of ethylene glycol were then added after which the mixture was further refluxed for an additional period of about four hours. The reaction mass was filtered to remove sodium chloride. Upon dilution of the filtrate with water, a precipitate of unreacted hexachlorobenzene was formed. It also was removed by filtration.

The second filtrate was acidified with hydrochloric acid. The product (pentachlorophenyl-mercapto) acetic acid which formed was filtered off as a precipitate and successively recrystallized from solutions in methanol, hexane and isooctane. The melting point of the product was about 157°–159° C. Upon analysis it was found to have a purity of at least about 90 percent.

Example 3

A potassium alkoxide reagent prepared with about 65 grams of potassium hydroxide and about 300 ml. of isopropanol was added to a boiling solution of about 300 grams of hexachlorobenzene in about 1200 ml. of pyridine over about a 20 minute period. The potassium chloride was filtered from the hot reaction mass and was washed with about 100 ml. of pyridine. The salt washings were then added to the reaction mass.

Unreacted hexachlorobenzene did not appear in visible quantities in the filtered reaction mass even after it was cooled to about 8° C.

The major proportion of the pyridine was removed under vacuum at about 40° C. The undistilled part of the reaction mass was then poured into about a liter of ice water to form solidified isopropyl pentachlorophenyl ether. The ether product was taken up in hot isopropanol and decolorized. On cooling with ice, about 254 grams of the product ether was formed having a melting point between about 53°–55° C.

In comparison, when isopropyl pentachlorophenylether was prepared using a mixture of about 500 ml. of isopropanol, 50 grams of hexachlorobenzene and 8 grams of powdered sodium hydroxide without employing a pyridic solvent for the reaction medium, only about a 63.5 percent conversion occurred to produce about 34.2 grams of product. This was despite the fact that the reaction was conducted at a reflux temperature of about 83.5° C. for a total period of time of about twenty-eight hours.

Example 4

A solution of about 2.0 grams of sodium hydroxide in about 25 ml. of methanol was rapidly added (within about 15 seconds) to a boiling solution of about 14.2 grams of hexachlorobenzene in about 125 ml. of pyridine. The reaction, by visual observation, appeared to have been completed in about one minute.

The reaction mass was filtered to remove sodium chloride before it was diluted with a liter of water. The 13.2 grams of solid pentachloroanisole which separated upon dilution of the reaction mass, representing a yield of about 93 percent, was found to have a melting point of about 105°–112° C.

In contrast, when it was attempted to perform the same reaction using xylene as the reaction medium in place of pyridine, no significant reaction was observed to occur.

Example 5

To about 500 ml. of boiling pyridine there was added about 50 grams of hexachlorobenzene and about 200 ml. of allyl alcohol. About 25 grams of finely divided sodium hydroxide was then added to the mixture. The reaction mass thus formed was boiled for about six minutes before being cooled in ice and subsequently filtered.

The filtrate was diluted with water to about 3.5 liters. This caused a precipitate to form which was filtered off and washed thoroughly with water. The product, taken up in methanol, was decolorized before the methanol solution was partially evaporated. Upon cooling, white allyl pentachlorophenyl ether was precipitated from the concentrated methanol solution. After two recrystallizations from acetone, the product was found to have a melting point of about 107°–108° C. and to contain about 56.3 percent by weight of chlorine in its molecule.

Example 6

About 14.5 grams of sodium hydroxide having a purity of about 97 percent was dissolved in about 180 ml. of tetraethylene glycol. This solution was added over about a 15 minute period to a boiling solution of about 100 grams of hexachlorobenzene in about 600 ml. of pyridine. The reaction mass which was thus formed was boiled for about five minutes. Sodium chloride was removed by filtration and washed with pyridine. The washings from the sodium chloride were added to the filtrate and the combined volume was diluted to a total volume of about 5.5 liters with water. Upon standing, an organic phase formed in a layer and was separated after about 48 hours. The product was extracted from the separated organic phase with about 500 ml. of ethanol. The product tetraethylene glycol pentachlorophenyl ether was recovered by evaporation of the ethanol solvent. Upon analysis, it was found to be in a substantially pure form.

Example 7

A sodium mercaptide reagent was prepared by dissolving about 25 ml. of isopropyl mercaptan in about 125 ml. of diethyl ether and adding an excess quantity (about 10 grams) of metallic sodium to the solution. The reagent was added over a period of about 0.5 hour to a boiling solution of about 65 grams of hexachlorobenzene in about 250 ml. of pyridine. The resulting reaction mass was boiled for an additional 0.5 hour in which interval some of the pyridine was lost from the mixture by evaporation.

The reaction mass was cooled and filtered. After diluting the filtrate with about 250 ml. of water a second phase was observed to form. The mixture was neutralized with concentrated hydrochloric acid and cooled to solidify the second phase. The solids which were thus formed were washed with water and taken up in diethyl ether. The ether solution was then filtered, decolorized, dried and partially evaporated. The first precipitate occurring upon evaporation was discarded. The remaining ether solution was cooled to about −50° C. to crystallize isopropyl pentachlorophenyl thioether from solution. The product thioether, upon recrystallization from ether solution, melted at about 56°–64° C.

*Example 8*

Ethyl pentachlorophenyl ether having a melting point between about 82° C. and 84° C., diethylene glycol pentachlorophenyl ether having a melting point between about 68° C. and 70° C. and dipropylene glycol pentachlorophenyl ether, a viscous liquid boiling at about 185° C. under about 0.1 mm. Hg pressure, were all formed in good yield and with substantial purity according to procedures similar to those set forth in the preceding examples.

*Example 9*

Following the general procedure of Example 4, hexachlorobenzene, methanol and sodium hydroxide were reacted in a commercially available mixture of 2,3,- 2,4- and 2,5-dimethyl pyridine. The pentachloroanisole product was formed in good yield with good conversion of the reactants.

Similar results obtained in the preparation of pentachloroanisole when either 2-methyl pyridine or 3-methyl pyridine was used as the reaction medium in place of pyridine.

By way of contrast, when the procedure of Example 4 is repeated using 2,6-dimethyl pyridine for dissolving the hexachlorobenzene, there is no apparent reaction and no significant yield of pentachloroanisole.

*Example 10*

A solution of about 1.6 grams of sodium hydroxide in 15 ml. of methanol was added with stirring to a hot solution of about 10 grams of pentachloroethylbenzene in 65 ml. of pyridine. The mixture was refluxed for about sixteen hours, after which sodium chloride, which had formed during the reaction, was removed by filtration. The filtered reaction mass was then diluted with water until a total volume of about 500 ml. was attained. During the dilution, a clear organic liquid separated. It was removed by decantation. Infrared analysis of the product indicated it to contain a major proportion of methoxytetrachloroethylbenzene.

*Example 11*

A mercaptide reagent was prepared by stirring about 8 grams of sodium hydroxide with 35 ml. of isopropyl mercaptan in about 60 ml. of hot pyridine. The reagent was in the form of a slurry. A solution of about 50 grams of pentachloroethylbenzene in 150 ml. of pyridine was added to the slurry. The resulting mixture was refluxed for about 2 hours. Most of the solids in the reaction mixture were observed to dissolve within about the first 20 minutes of the reflux period. The reaction, by visual observation, appeared to have been substantially completed within about 0.5 hour. The reaction mass was diluted with water whereupon an organic liquid separated. The liquid was removed and purified from unreacted merceptan. It was found by infrared analysis to consist essentially of the product isopropyl tetrachloroethylphenyl thioether.

As mentioned, other polychlorobenzenes such as pentachlorotoluene and the like may be utilized as well as pentachloroethylbenzene in the method of the present invention along with a variety of alkoxide and mercaptide reagents for preparing various desired ether and thioether products.

Since certain changes and modifications in the practice of the present invention can readily be entered into without departing substantially from its spirit and scope, it is to be understood that all of the foregoing description be interpreted as being merely illustrative and in no sense limiting of the invention as it is set forth in the appended claims.

What is claimed is:

1. Method for preparing a compound selected from the group consisting of polychlorophenyl ethers and thioethers which comprises reacting a polychlorobenzene in pyridic solution in which the pyridine compound has at least one open position in the 2- and 6-position on the pyridine ring, with a reagent compound selected from the group consisting of the metal alcoholates of aliphatic mono- and dihydric alcohols and of aliphatic mono- and dithiols.

2. Method for preparing a compound selected from the group consisting of polychlorophenyl ethers and thioethers which comprises reacting a polychlorobenzene in pyridic solution in which the pyridine compound has at least one open position in the 2- and 6-position on the pyridine ring, at a temperature between about 75° C. and about 125° C. with a reagent compound selected from the group consisting of the metal alcoholates of aliphatic mono- and dihydric alcohols and of aliphatic mono- and dithiols.

3. Method for preparing a compound selected from the group consisting of polychlorophenyl ethers and thioethers which comprises reacting a polychlorobenzene in pyridic solution in which the pyridine compound has at least one open position in the 2- and 6-position on the pyridine ring, at a temperature between about 75° C. and about 125° C. and at about atmospheric pressure with a reagent compound selected from the group consisting of alkali metal alcoholates of aliphatic mono- and dihydric alcohols and of aliphatic mono- and dithiols.

4. The method of claim 3 wherein the pyridic solution is comprised of a polychlorobenzene and a substituted pyridine having at least one open position in the 2- and 6-positions of the pyridine ring.

5. The method of claim 3 wherein the pyridic solution is comprised of a polychlorobenzene and pyridine.

6. Method for preparing a compound selected from the group consisting of polychlorophenyl ethers and thioethers which comprises reacting, in a pyridic solution in which the pyridine compound has at least one open position in the 2- and 6-position on the pyridinic ring, and at a temperature between about 75° C. and about 125° C. and at about atmospheric pressure, a polychlorobenzene, having the formula

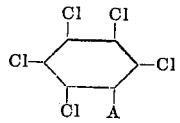

wherein A is selected from the group consisting of chlorine and alkyl group substituents having from 1 to 8 carbon atoms, with a reagent compound selected from the group consisting of alkali metal alcoholates of aliphatic mono- and dihydric alcohols and of aliphatic mono- and dithiols.

7. The method of claim 6 wherein the pyridic solution is comprised of the polychlorobenzene and a substituted pyridine having at least one open position in the 2- and 6-positions of the pyridine ring.

8. The method of claim 6 wherein the pyridic solution is comprised of the polychlorobenzene and pyridine.

9. The method of claim 6 wherein the reacting temperature between about 75° C. and 125° C. is about at the boiling temperature at atmospheric pressure of the reaction mass.

10. Method for preparing a compound selected from the group consisting of pentachlorophenyl ethers and thioethers which comprises reacting a solution of hexachlorobenzene in pyridine at a temperature between about 100° C. and the boiling point of the pyridine solution and at atmospheric pressure with a reagent compound selected from the group consisting of alkali metal alcoholates of aliphatic mono- and dihydric alcohols and of aliphatic mono- and dithiols.

11. Method for preparing a compound selected from the group consisting of pentachlorophenyl ethers and thioethers which comprises reacting, in about equimolar proportions, a solution of hexachlorobenzene in pyridine at a temperature between about 100° C. and the boiling point of the pyridine solution and at atmospheric pressure with a reagent compound selected from the group consisting of alkali metal alcoholates of aliphatic mono- and dihydric alcohols and of aliphatic mono- and dithiols.

12. The method of claim 11 wherein the reagent compound is an alkali metal alkoxide.

13. The method of claim 11 wherein the reagent compound is an alkali metal mercaptide.

References Cited in the file of this patent

UNITED STATES PATENTS

| | | |
|---|---|---|
| 2,591,776 | Borrows | Apr. 8, 1952 |
| 2,594,935 | Ladd et al. | Apr. 29, 1952 |
| 2,615,823 | Lawlor et al. | Oct. 28, 1952 |

OTHER REFERENCES

MacArdle: Use of Solvents in Synthetic Organic Chemistry, pp. 3, 7, 38, 39, 105 and 107–112 (1925 Edition), D. Van Nostrand Company, New York, New York.

Barr et al.: J. Am. Chem. Soc. 72, 4480–4482 (1950).